Jan. 25, 1927.
J. A. MULLINS
1,615,340
SPRING HANGER FOR VEHICLES
Filed Sept. 17, 1925
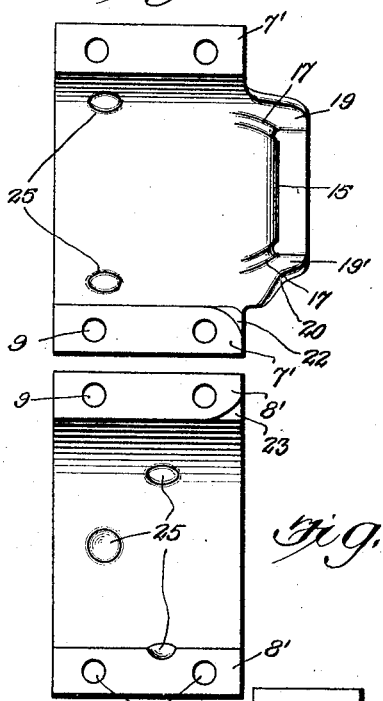
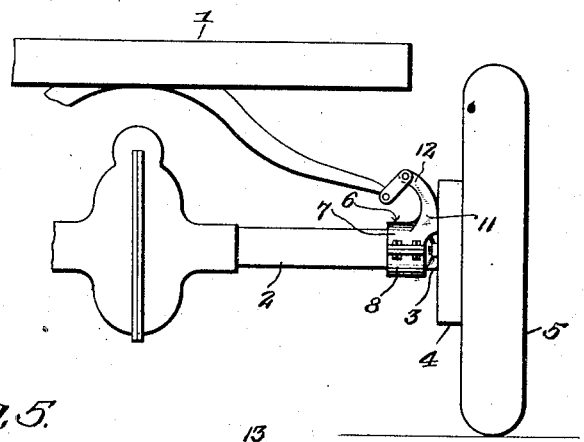
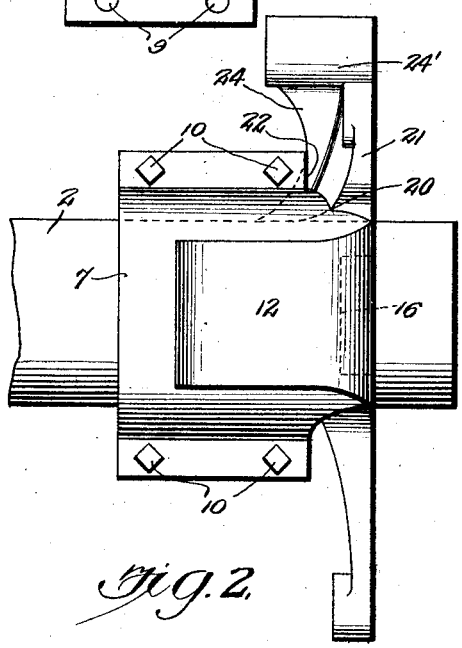
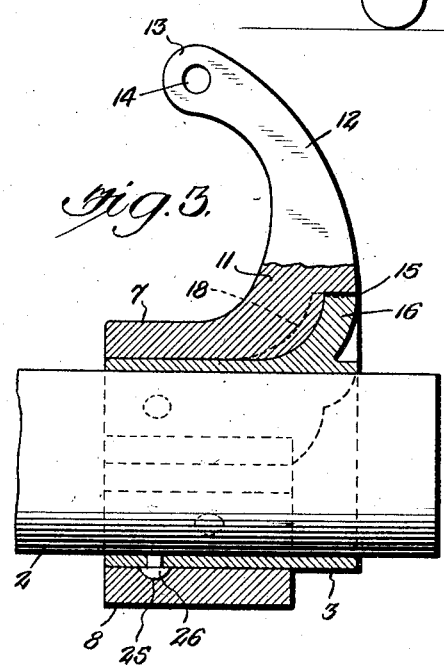
Inventor
J. A. Mullins,
By
Attorney Patented Jan. 25, 1927.

1,615,340

UNITED STATES PATENT OFFICE.

JOHN A. MULLINS, OF SWEETWATER, TEXAS.

SPRING HANGER FOR VEHICLES.

Application filed September 17, 1925. Serial No. 56,920.

This invention relates to emergency spring hangers for automobiles of the Ford type in which the rear spring thereof is supported by a spring hanger or perch cast integrally with a sleeve member which is carried rigidly by the rear axle housing. This sleeve member is usually also immovably fastened to the rear brake drum housing by suitable means. In this construction, in the event of a spring hanger being broken, it is necessary to remove the entire half of the rear axle housing carrying the bracket member and broken spring hanger and replace the same with a new member. Such an operation involves considerable labor and expense and necessitates skilled labor and the use of special tools particularly adapted to the various parts which are affected. Furthermore this procedure takes considerable time to complete.

It is an object, therefore, of this invention to provide a device simple in construction and consisting of few parts which can be cheaply and easily made and which may be applied or clamped over the rear axle housing and broken spring hanger without the necessity of removing or disassembling any part thereof, and without the use of special tools or the employment of skilled labor.

It is a further object of this invention to provide a device which, when once installed, may be used as a permanent spring hanger or used merely as an emergency replacement for a broken part, as desired.

The invention will be best understood from a consideration of the following detailed description taken in connection with the accompanying drawing forming a part of this specification, with the understanding, however, that the invention is not confined to any strict conformity with the showing of the drawing but may be changed and modified so long as such changes and modifications mark no material departure from the salient features of the invention as expressed in the appended claims.

Figure 1 is a side elevation of an emergency spring hanger constructed in accordance with this invention and shown applied to a Ford automobile.

Fig. 2 is a plan view of the emergency hanger.

Fig. 3 is a partial sectional view of the device shown applied to a broken hanger.

Figs. 4 and 5 are views of the upper and lower clamping members separated so as to show the interior construction.

Like characters of references indicate like parts throughout the several views.

Referring now more particularly to the drawing in detail, it will be seen that 1 indicates the usual rear construction of an automobile of the Ford type, only so much being shown as is thought necessary to a clear understanding of the invention. 2 represents the usual rear axle housing and 3 the sleeve member fixed to and surrounding the housing in the usual manner and from which arm members (hereinafter referred to) extend to support the brake drum housing. This sleeve member 3 carries the original spring hanger. 4 denotes the usual brake drum and 5 the conventional wheel. This construction, just described, is as stated, of the usual type and is shown to more clearly differentiate therefrom the invention proper which consists of the several parts about to be described.

The device embodying this invention comprises a two part casting in the form of a collar indicated generally by the numeral 6. This collar constitutes an upper portion 7 and a lower portion 8. These portions are, as shown, substantially semi-circular in formation to enable them to be fitted about the cylindrical member or sleeve 3 which is secured to the drum body 4, and into which the end of the housing 2 is extended.

Each of the portions 7 and 8 has formed along its edge the laterally projecting flanges 7' and 8', each of which is provided with a plurality of apertures 9 which when the sections are in position, fall in alignment for the extension therethrough of securing bolts 10.

The upper portion 7 of the casting is provided with a thickened portion 11 which as shown, extends beyond the end edge of the member and forms the base of the upwardly and inwardly curved arm 12 which constitutes the substitute emergency spring hanger or perch. The upper end of the arm 12 terminates in the head 13 through which a bore 14 is formed, which as shown, extends transversely of the member.

The under side of the base 11 of the hanger has formed therein the recess 15 which, when the device is applied, is designed to fit over the broken end or base of the original hanger formed upon the sleeve 3. The lower portion of this original hanger is indicated by the numeral 16.

The under surface of the base 11 is further provided with grooves, as indicated at the points 17, to receive the webs 18 which are formed on each side of the hanger 16, and these grooves are formed at the point of joinder between the base 11 and the flanges 19 and 19′ which form the sides of the recess 15. It will be readily apparent that when the member 7 is drawn down upon the axle housing, the webs 18 seating in these grooves, together with the lodging of the stump of the hanger 16 in the recess 15, will set up a locking engagement between this part and the housing which cannot be broken, and any possibility of the member turning upon the housing is entirely eliminated.

In order to obtain a still stronger grip upon the member 3 of the housing, the flange 19′ is provided with the notch 20 which is designed to engage over the edge of the arm 21 which forms a permanent part of the sleeve 3 and each of the portions is further cut away at the points 22 and 23 to enable the sections to be fitted over and grip the flange or web 24 connecting the face of the arm 24′ with the sleeve.

The interior surfaces of the semi-cylindrical portions 7 and 8 of the member 6 have formed in their faces indentations or recesses 25, which are designed to fit over the heads of the rivets 26 which secure the sleeve 3 to the axle housing 2. Owing to the manner in which the base 11 of the auxiliary hanger 12 is extended a slight distance beyond the edge of the portion 7 upon which it is formed, the rear face of the base will abut against the drum housing and be held securely thereagainst when the two portions are bolted together, thus preventing any movement longitudinally of the axle housing.

From the foregoing, it will be clearly seen that when the portions 7 and 8 of the collar 6 are drawn together by their securing bolts 10, about the sleeve 3, the stump of the broken hanger 16 and the webs 18 formed along the sides thereof, will be snugly seated in the recess 15 and grooves 17 and it will be impossible for the collar to turn about the sleeve. The lodging of the arm 21 in the notch 20 of this device and the gripping of the web 24 of the arm 24′ between the edges of the portions further strengthens the grip of the device about the sleeve to make more positive its hold thereon. The adjacent end of the rear spring may be then bolted to the head 13 of the auxiliary or emergency hanger with the same ease with which it could be attached to the original perch, thus permitting the rear spring to occupy the same position and have the same free swing as permitted by the original hanger.

Although the foregoing description has been confined to a device for use upon a particular well known type of car, it is to be understood that applicant does not wish to limit himself to using the device upon this car only, but he may use it wherever it is found applicable.

Having thus described my invention, what I claim is:

1. A replacement device for broken spring hangers, comprising a body member adapted to be secured to a vehicle axle over an original broken hanger base carried thereon, and an upstanding arm carried by said body and constituting a substitute hanger.

2. A replacement device for broken spring hangers, comprising a body member adapted to be secured to a vehicle axle adjacent an original broken hanger base carried thereon, an upstanding arm carried by said body and constituting a substitute hanger, and means whereby said body may be caused to grip said axle to prevent circumferential movement of the same thereon.

3. A replacement device for broken spring hangers, comprising a body member adapted to be secured to a vehicle axle carrying a broken hanger base, means whereby said body may be caused to engage over and grip said broken base, and an arm extending upwardly from said body above said base constituting a substitute spring hanger.

4. A replacement device for broken spring hangers, comprising a body member adapted to be secured to a vehicle axle carrying thereon a broken hanger base, said body having a recess formed therein to receive said base, and a substitute hanger carried by said body and overlying said broken hanger base when the body is in position.

5. A replacement device for broken spring hangers, comprising a collar formed in two sections, means whereby said sections may be secured together about an axle, one of said sections having a recess therein to receive the base of a broken hanger carried upon the axle, and an arm constituting a substitute hanger, carried by said recessed section.

6. A replacement device for broken spring hangers, comprising a collar formed in two sections, means whereby said sections may be secured together about an axle, one of said sections having a recess therein to receive the base of a broken hanger carried upon the axle, an arm constituting a substitute hanger carried by said recessed section, and means whereby said sections may be caused to grip upstanding portions of said axle to prevent circumferential movement of the collar thereabout.

In testimony whereof I have hereunto set my hand.

JOHN A. MULLINS.